(12) United States Patent
Horiuchi et al.

(10) Patent No.: US 6,204,938 B1
(45) Date of Patent: Mar. 20, 2001

(54) LINEAR ILLUMINATION DEVICE AND IMAGE READING APPARATUS USING THE SAME

(75) Inventors: Toshiro Horiuchi; Kohichi Takesako; Takashi Yamanaka; Yoshihiko Chosa, all of Kagoshima-ken; Tetsuro Nakamura, Takarazuka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/115,062

(22) Filed: Jul. 14, 1998

(30) Foreign Application Priority Data

Jul. 14, 1997 (JP) .................................................. 9-188087

(51) Int. Cl.[7] ............................... H04N 1/04; H04N 1/46
(52) U.S. Cl. .......................... 358/484; 358/475; 358/509
(58) Field of Search .................................. 358/475, 506, 358/509, 505, 474, 497, 494, 484; 250/208.1, 227.31; 359/34; 362/800; 399/220, 221

(56) References Cited

U.S. PATENT DOCUMENTS

| 5,499,112 | * | 3/1996 | Kawai et al. | 358/475 |
| 5,777,433 | * | 7/1998 | Lester et al. | 362/800 |
| 5,959,740 | * | 9/1999 | Takeda et al. | 358/475 |
| 5,965,870 | * | 10/1999 | Tabata | 250/208.1 |
| 5,969,343 | * | 10/1999 | Nakamura et al. | 250/227.31 |

FOREIGN PATENT DOCUMENTS

| 0 607 903 | 7/1994 | (EP) . |
| 8-43633 | 2/1996 | (JP) . |

* cited by examiner

*Primary Examiner*—Cheukfan Lee
(74) *Attorney, Agent, or Firm*—Ratner & Prestia

(57) ABSTRACT

A linear illumination device, includes: a light conducting body; a light diffusion portion formed at least on one side surface in a longitudinal direction of the light conducting body; a light output portion formed in a portion of the light conducting body opposing the light diffusion portion; a light source portion disposed at a first end of the light conducting body; and a light reflecting layer provided at a second end opposing the first end of the light conducting body.

27 Claims, 17 Drawing Sheets

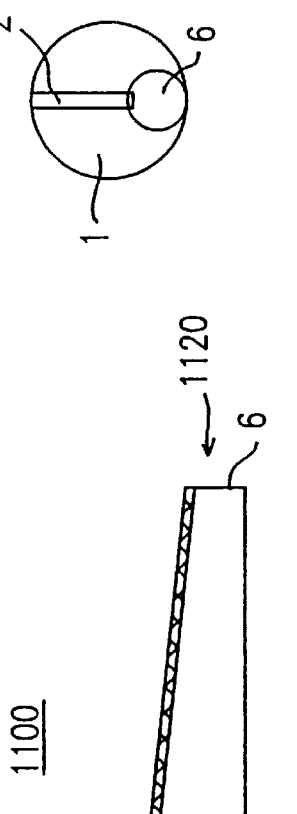
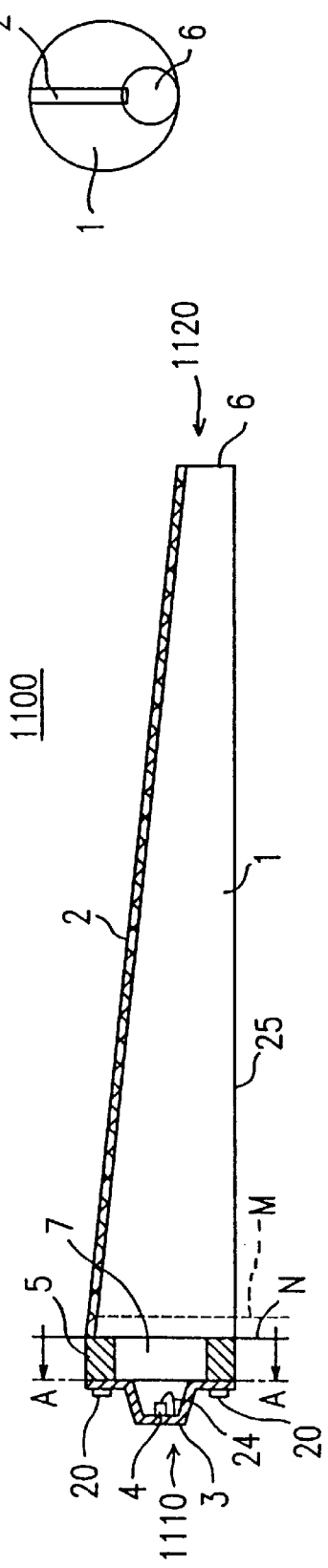
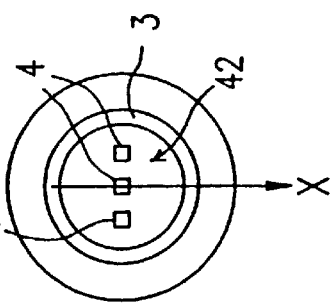
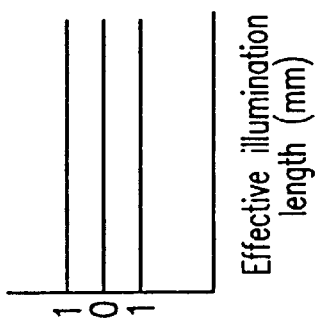
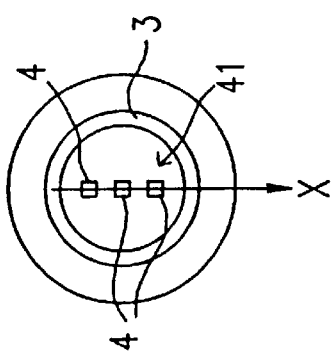

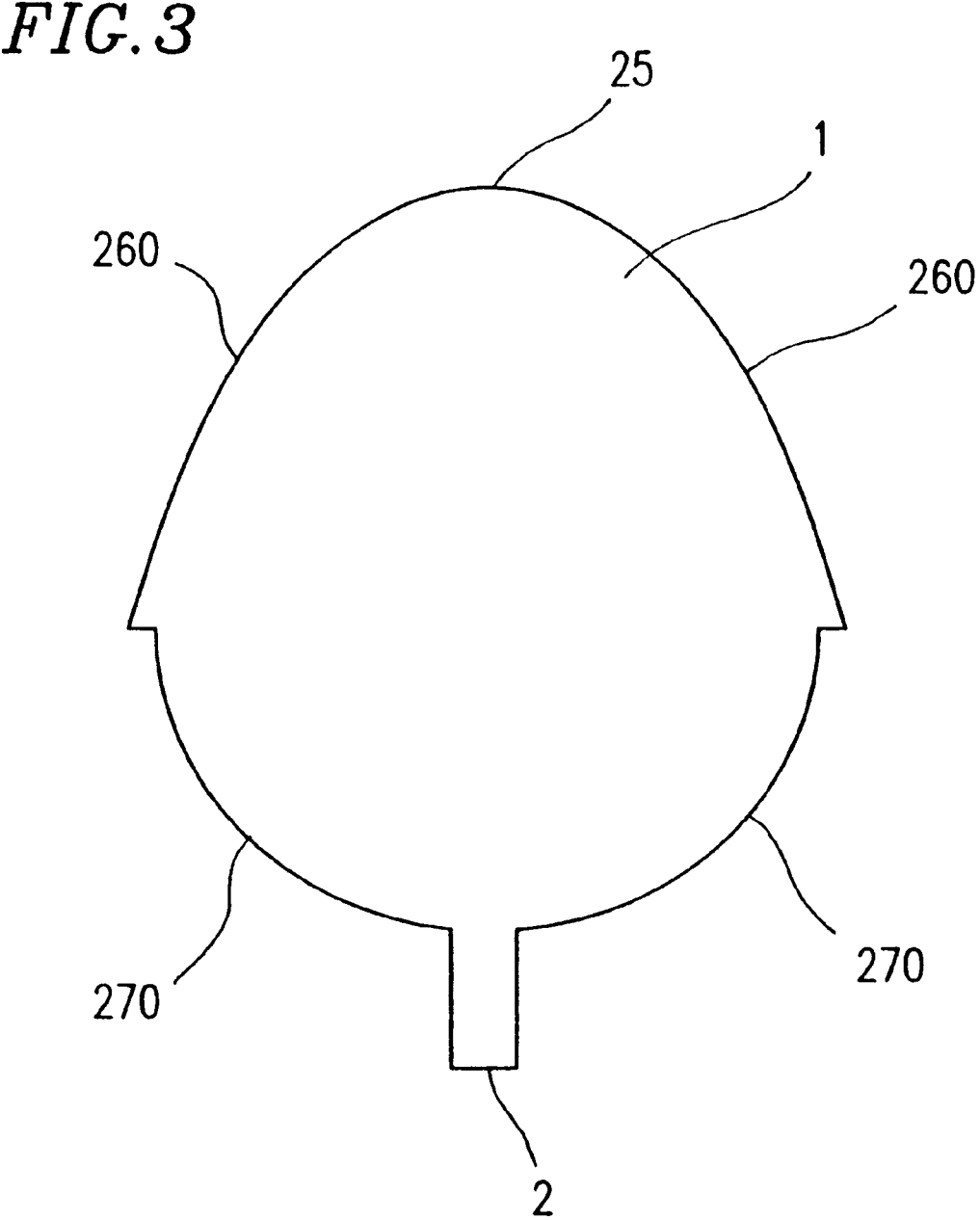

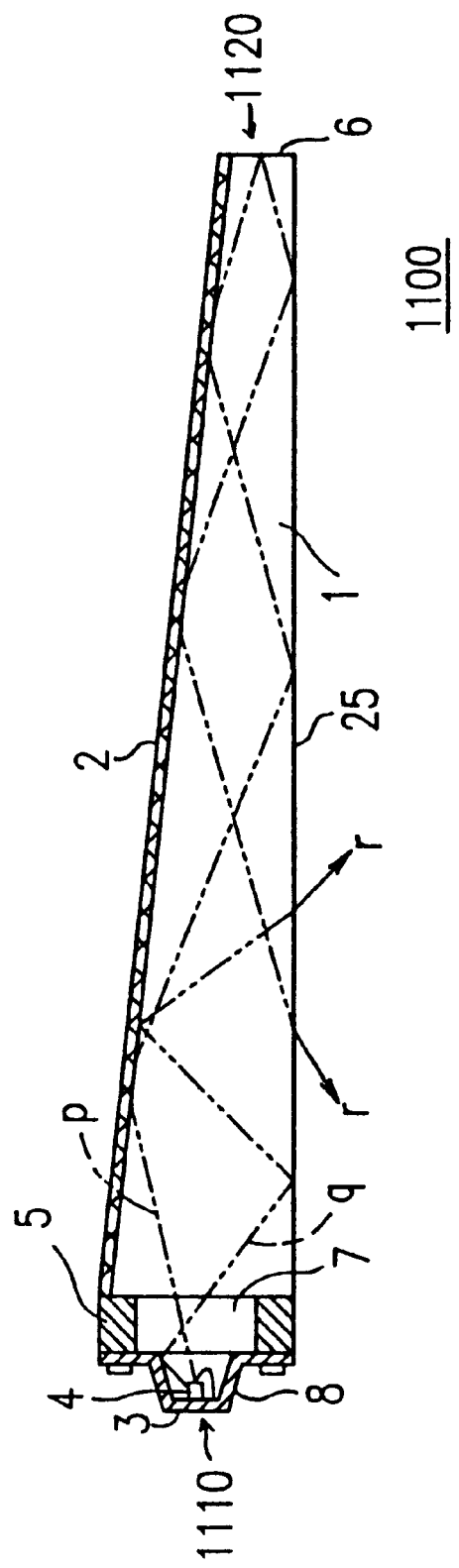

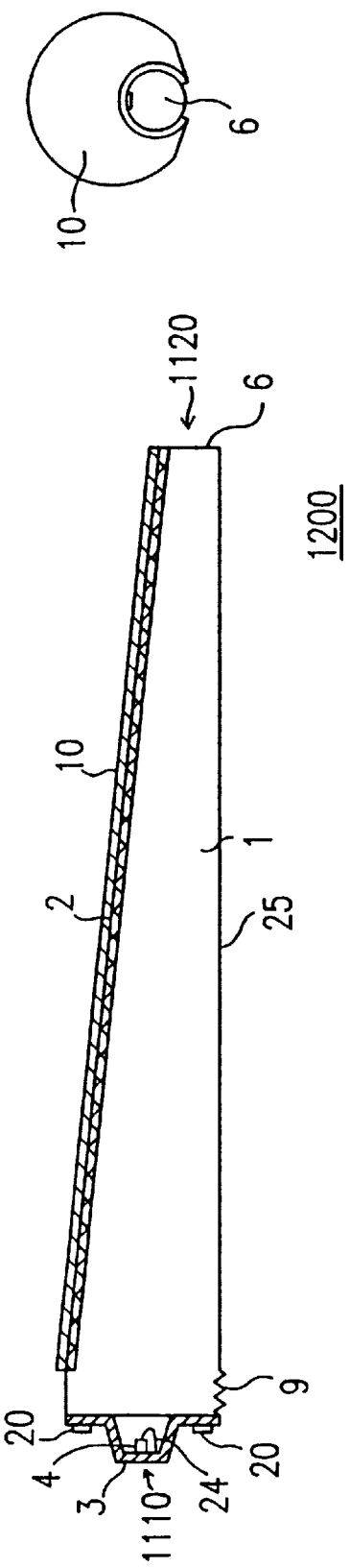

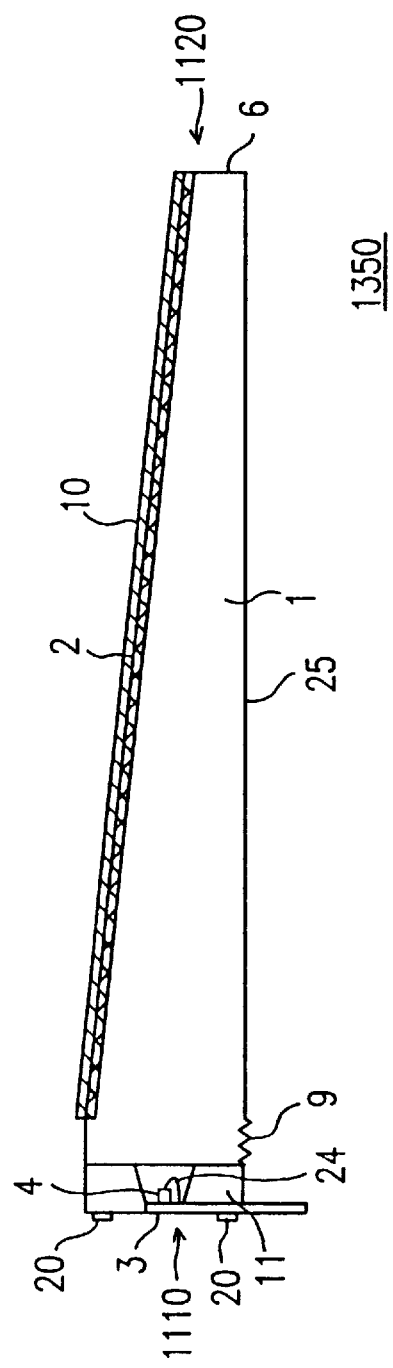
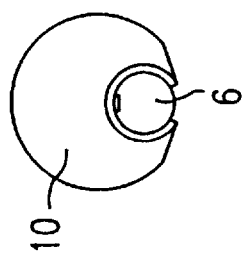
FIG. 9A
FIG. 9B

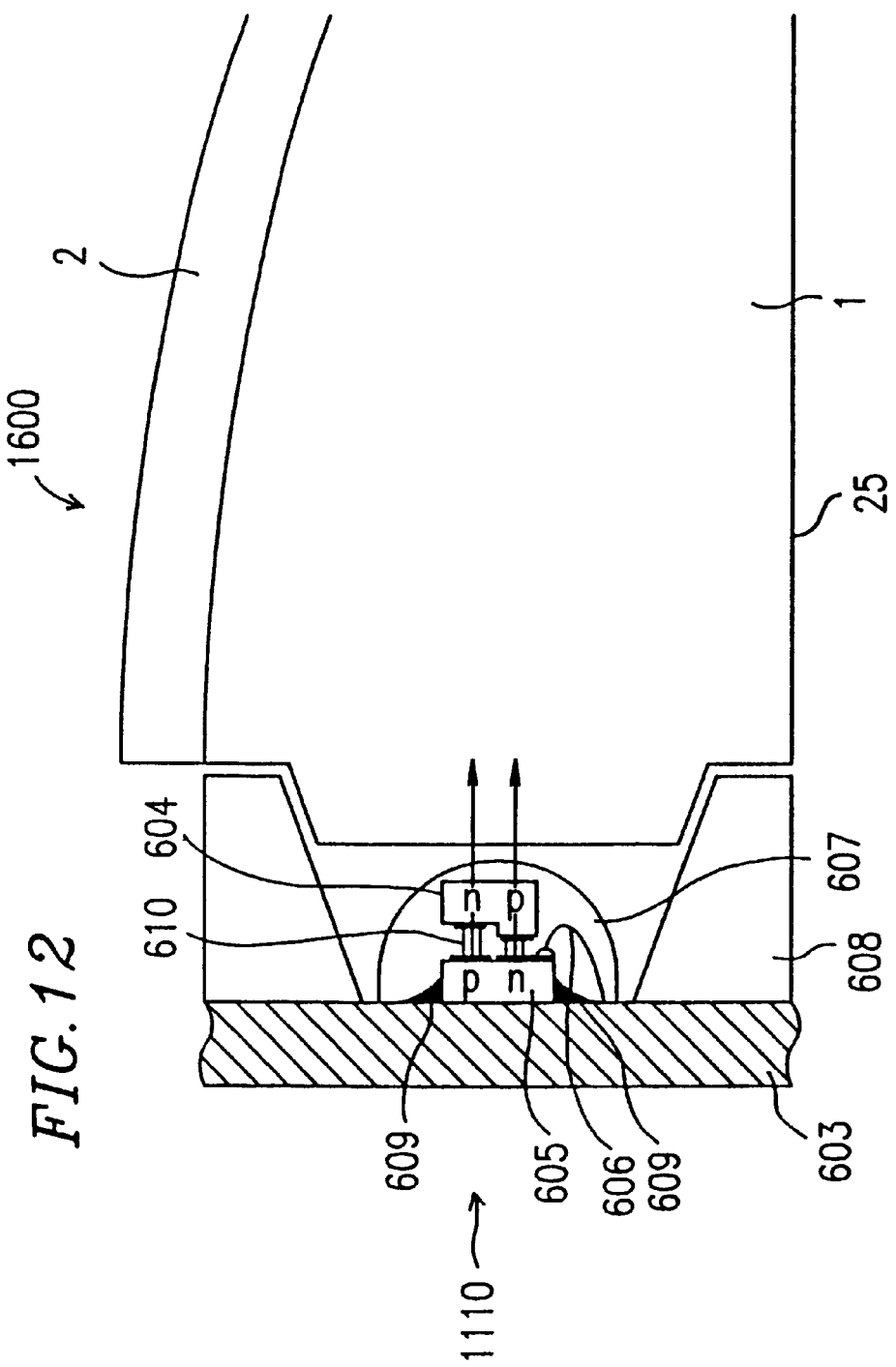

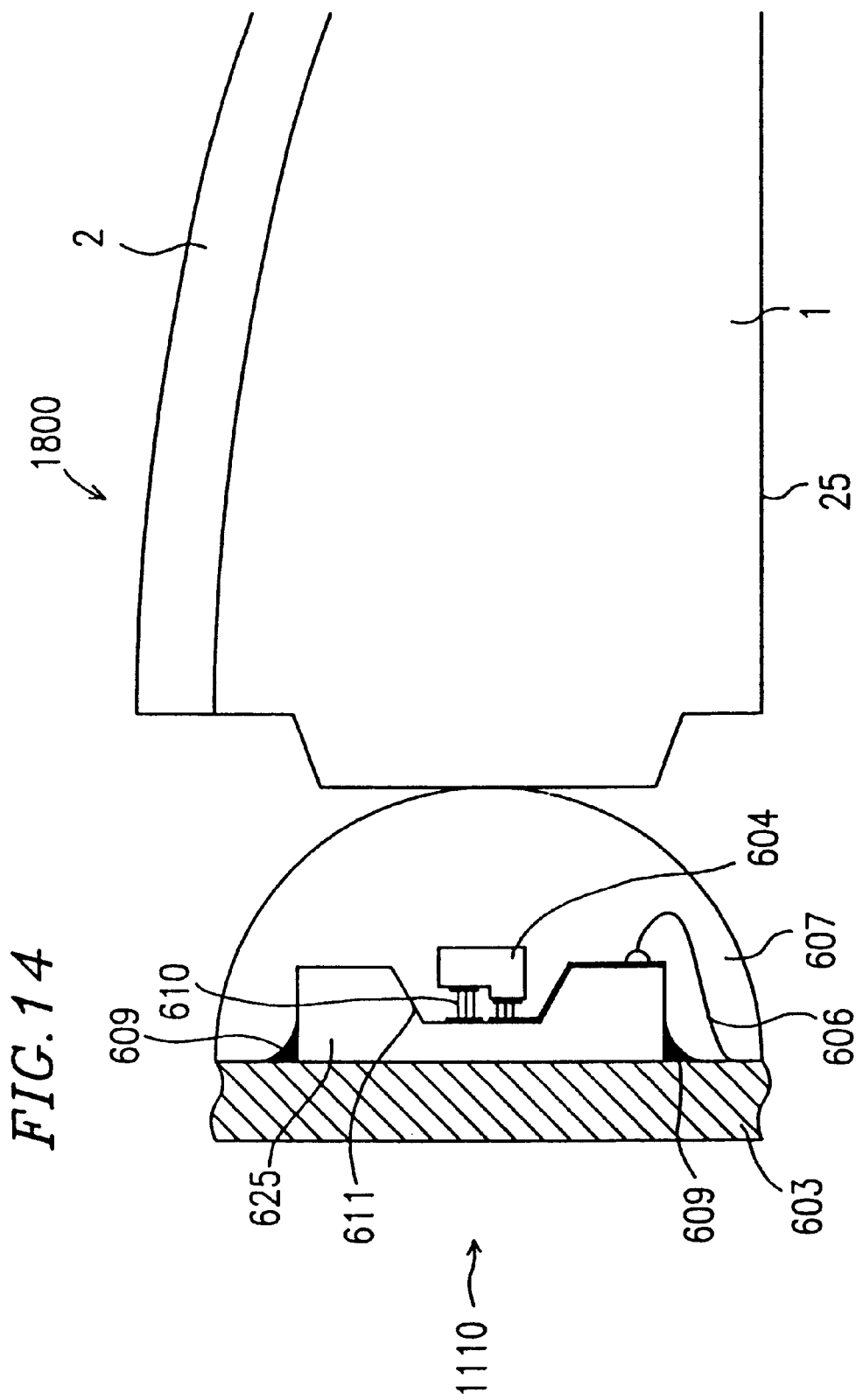

LINEAR ILLUMINATION DEVICE AND IMAGE READING APPARATUS USING THE SAME

BACKGROUND OF THE INVENTION

1. Field of the Invention

The present invention relates to a linear illumination device having a light conducting body and an image reading apparatus using the same.

2. Description of the Related Art

Conventionally, in an illumination device for a facsimile apparatus or an image reading apparatus such as a scanner and a bar code reader, an LED array in which a number of light-emitting devices such as light-emitting diodes are arranged in an array are generally used. (In this application, light-emitting devices such as light-emitting diodes are collectively referred to as LEDs.) In an illumination apparatus with such a structure, a decrease in the number of LEDs to be used in a light source portion causes a decrease and a variation of the illuminance, which makes it difficult to decrease the number of LEDs. Furthermore, since an LED emitting blue light is expensive, it is difficult to reduce fabrication cost.

On the other hand, as a method for decreasing the number of LEDs for the purpose of reducing fabrication cost, a technique of using a light conducting body has been proposed, for example, in Japanese Laid-open Publication No. 8-43633. A structure of an illumination device 100 based on such a conventional technique is shown in FIG. 16.

In an illumination device 100 shown in FIG. 16, one side surface of a bar-shaped light conducting body 101 is provided with a light diffusion portion 102 in parallel with an axis of the light conducting body 101. Illuminants 103 are formed on both ends of the light conducting body 101 so as to be close to light incident surfaces 104a and 104b. Light which is incident upon an inside of the light conducting body 101 from the illuminant 103 travels through the light conducting body 101 in accordance with Snell's law. Light which reaches the light diffusion portion 102 on its way is reflected and diffused by the light diffusion portion 102, and is output from a light-emitting surface 105 opposing the light diffusion portion 102 of the light conducting body 101.

Furthermore, a structure of an image reading apparatus 200 using a conventional illumination device 210 is shown in FIG. 17.

In the illumination device 210 of the image reading apparatus 200 shown in FIG. 17, LEDs 214 are mounted on a printed wiring board 212 as a light source portion, and the LEDs 214 are sealed with a transparent resin 216. The illuminance of the LEDs 214 is determined based on a current flowing therethrough. The level of the current is set by a resistance value of a resistor 218.

Output light 220 from the illumination device 210 passes through a cover glass 222 (which functions as a document table and a cover), is incident upon a surface of an original surface (i.e., a document surface) 224 (subject) to be illuminated, and is reflected from the original surface 224. Reflected light 226 passes through the cover glass 222, and is incident upon a rod lens array 230 fixed by a metal frame 228. An image of the original surface 224 is formed on a photoelectric conversion element 234 mounted on a wiring board 232 by the rod lens array 230.

Furthermore, the printed wiring board 212 on which the LEDs 214 are mounted and the wiring board 232 on which the photoelectric conversion element 234 is mounted are electrically connected to each other via leads 236, for example, with a solder 238.

However, in the above-mentioned conventional illumination device 100 shown in FIG. 16, the illuminants 103 as a light source portion are required to be placed on both ends of the light conducting body 101, which enlarges the size of the device. Therefore, when such an illumination device 100 is used as a contact-type image sensor or the like which is intended to be miniaturized or made compact, inconvenience of enlargement of the entire structure is caused.

Furthermore, the above-mentioned conventional image reading apparatus 200 shown in FIG. 17 uses the leads 236 for electrically connecting the illumination device 210 to the photoelectric conversion element 234. Therefore, particularly in a system in which the three LEDs 214 respectively emitting three colors of light (i.e., red, blue, and green) are used as a light source and a colored original (document) is read by switching between the LEDs, the number of the leads 236 increases, causing inconvenience of complicated wiring. In addition, due to the increase in number of the leads 236, a space for accommodating the wiring therein is required to be enlarged, which hinders miniaturization of an image reading apparatus. Furthermore, when leads with a small diameter are used for the purpose of decreasing an occupied space of the leads 236, it becomes difficult to attach the leads 236 to the wiring boards 212 and 232, and the leads 236 become likely to be cut.

SUMMARY OF THE INVENTION

A linear illumination device of the present invention includes: a light conducting body; a light diffusion portion formed at least on one side surface in a longitudinal direction of the light conducting body; a light output portion formed in a portion of the light conducting body opposing the light diffusion portion; a light source portion disposed at a first end of the light conducting body; and a light reflecting layer provided at a second end opposing the first end of the light conducting body.

In one embodiment, the device further includes a non-light diffusion portion provided between the light source portion and the light diffusion portion.

In another embodiment, the device further includes a rough surface for diffusing light, provided in a portion of the light conducting body between the light source portion and the light diffusion portion.

Preferably, at least a portion of a cross-sectional shape perpendicular to the longitudinal direction of the light conducting body has an arch shape. The arch shape may be a portion of a circle, an oval, or a combination thereof.

Preferably, the light conducting body is made of a transparent material, and a size of a diameter of the second end of the light conducting body at which the light reflecting layer is disposed is smaller than a diameter of the first end of the light conducting body at which the light source portion is disposed.

In one embodiment, a triangular wave surface including a plurality of triangular configurations is formed on the light diffusion portion.

In one embodiment, the light source portion contains a light emitting device having at least one luminescent color of red, green, and blue.

In one embodiment, a red light emitting device, a green light emitting device, and a blue light emitting device are disposed in the light source portion along a line substantially parallel to a normal to the triangular wave surface.

The red light emitting device, the green light emitting device, and the blue light emitting device may be controlled in a time-divisional manner.

In one embodiment, the device further includes a light reflecting unit provided around an outer peripheral portion of the light conducting body at least excluding the light output portion.

The light reflecting unit may be a reflecting case, and the light conducting body may be accommodated in the reflecting case.

In one embodiment, the light source portion includes a substrate having a concave portion with a sloped side wall and a light emitting device mounted on a bottom surface of the concave portion of the substrate.

In one embodiment: a surface is provided at a level different from a level of the bottom surface in the concave portion of the substrate; a first conductive pattern is provided on the bottom surface of the concave portion and a second conductive pattern is provided on the surface at the different level; and the light emitting device is mounted on the first conductive pattern and is electrically connected to the second conductive pattern by a metal fine wire.

In one embodiment, the light source portion has a light emitting device which is mounted on a substrate in a concave portion of a case formed by integrally molding the substrate and a resin.

In one embodiment, the light emitting device has a P-electrode and an N-electrode on an identical side, and the P-electrode and the N-electrode are electrically connected to a predetermined wiring pattern on the substrate in the concave portion via a conductive adhesive or microbumps.

The concave portion may be sealed with a transparent resin having a refractive index which is almost the same as a refractive index of the light conducting body.

In one embodiment: the light source portion has a light emitting device and an electrostatic protecting element electrically connected to the light emitting device; the light emitting device has a P-type semiconductor region and an N-type semiconductor region formed on a substrate; and the electrostatic protecting element has two polar portions electrically connected respectively to the P-type semiconductor region and the N-type semiconductor region of the light emitting device, and is configured so that an electric current flows between the two polar portions when a certain voltage exceeding a predetermined voltage which is equal to or smaller than a breakdown voltage is applied across the P-type semiconductor region and the N-type semiconductor region of the light emitting device.

The light emitting device and the electrostatic protecting element may be electrically connected to each other via microbumps.

A plurality of the light emitting devices may be connected to the identical electrostatic protecting element.

The electrostatic protecting element may have a reflecting structure which reflects light from the light emitting device.

For example, the reflecting structure may be a recess, and an inside of the recess may be sealed with a resin.

The light emitting device may be a GaN type compound semiconductor light emitting device mounted on a transparent substrate.

The transparent substrate may have a dome shape or a cup shape.

The electrostatic protecting element may have an electrode formed so as to reflect light from the light emitting device.

The electrostatic protecting element may be a diode.

An image reading apparatus of the present invention includes: a first substrate and a second substrate; a linear illumination device, which has a light source attached to the first substrate; and a photoelectric conversion element which is mounted on the second substrate and responds to light emitted from the light source portion of the linear illumination device and reflected from a predetermined subject. The linear illumination device is the one as described above. The first substrate and the second substrate are disposed so as to abut against each other. A wiring pattern provided on the first substrate and a wiring pattern provided on the second substrate are electrically connected to each other at the abutting portion or in the vicinity thereof.

Preferably, the first substrate is extended so as to abut against the second substrate.

The wiring pattern provided on the first substrate and the wiring pattern provided on the second substrate may be electrically connected to each other via a solder.

The linear illumination device of the present invention is provided with a light reflecting layer, whereby the number of light-emitting devices (LEDs) used as a light source portion is reduced and light can be utilized efficiently.

A variation of the illuminance can be eliminated by further providing a non-light diffusion portion between a light source portion and a light diffusion portion.

The illuminance can be prevented from locally increasing in a light conducting body and a variation of the illuminance can be suppressed by forming a rough surface for diffusing light in a portion of the light conducting body between the light source portion and the light diffusion portion.

At least a portion of a cross-sectional surface perpendicular to a longitudinal direction of the light conducting body, in particular, a light output portion for outputting light therefrom may be formed so as to have a circle shape, an oval shape, or an arch shape made of a combination thereof. In such a case, even when a light illumination device and a subject which receives light therefrom are disposed at any angle, the subject can receive a predetermined amount of light.

The light conducting body may be made of a transparent material, and a size of a diameter of an end (second end) of the light conducting body at which the light reflecting layer is disposed may be made smaller than a diameter of an end (first end) of the light conducting body at which the light source portion is disposed. In such a case, an amount of light in the light conducting body on the light reflecting layer side farthest from the light source portion can be increased.

Light can be efficiently utilized and a variation of the illuminance can be eliminated by forming a triangular wave surface including many triangular configurations on the light diffusion portion. Furthermore, uniform illuminance can be obtained while a shift of a width of condensed light is eliminated, by arranging the light-emitting devices in almost parallel with a normal to the triangular wave surface.

A color original (i.e., a color document) can be read by using a red light-emitting device emitting red light, a green light-emitting device emitting green light, and a blue light-emitting device emitting blue light as the light-emitting devices. Furthermore, when these light-emitting devices are controlled in a time-divisional manner, it is not necessary to use a photo-electric conversion element for a color image, thereby realizing an image reading apparatus at a low cost.

When a light reflecting unit is provided around an outer peripheral portion of the light conducting body excluding the light output portion, light which is output in the air from an inside of the light conducting body in such a direction that is not directed to the surface of an original can be reused, resulting in an increase in illumination efficiency.

When a light reflecting unit is made into a reflecting case, and the light conducting body is accommodated in the reflecting case, light which is output in the air from an inside of the light conducting body can be reused.

When the light source portion is composed of a substrate having a concave portion with sloped side walls and a light-emitting device mounted on a bottom surface of the concave portion of the substrate, orientation characteristics of the light-emitting device can be arbitrarily set by selecting the shape of the concave portion.

The linear illumination device can be miniaturized by mounting the light-emitting device on a substrate in a concave portion of a case formed by integrally molding the substrate and a resin. Alternatively, light-emitting device may be formed so as to have a P-electrode and an N-electrode on an identical side and to be electrically connected to a bottom surface of the concave portion of the substrate (i.e., to a predetermined wiring pattern on the substrate in the concave portion) via a conductive adhesive or microbumps, whereby the linear illumination device can be miniaturized.

When the inside of the concave portion of the substrate is sealed with a transparent resin having a refractive index which is almost the same as that of the light conducting body, the light conducting body is optically matched with the concave portion of the substrate, and the illuminance is improved.

According to the structure in which an electrostatic protecting element is connected in parallel between the P-type semiconductor region and the N-type semiconductor region of the light-emitting device, even when a high voltage (equal to or higher than a breakdown voltage) is applied across the P-type semiconductor region and the N-type semiconductor region of the light-emitting device by static electricity or the like, a bypass current flows between two polar portions of the electrostatic protecting element. Thus, the light-emitting device is protected without being damaged, and a linear illumination device highly endurable to static electricity can be obtained.

Furthermore, when the light-emitting device is electrically connected to the electrodes of the electrostatic protecting element via microbumps, a linear illumination device having outstanding mass-productivity and satisfactory production yield and reliability can be obtained.

When a plurality of light-emitting devices are connected to one substrate on which an electrostatic protecting element is formed, fabrication cost is reduced and the light source portion can be miniaturized.

When the electrostatic protecting element is configured to have a reflecting structure (specifically, a recess) reflecting light from the light-emitting device, and an inside of the reflecting structure is sealed with a resin, then a radiation flux immediately above the light-emitting device is increased, and light from the light-emitting device can be utilized efficiently in the light conducting body. Thus, uniform illuminance can be obtained.

Alternatively, even by using a GaN type compound semiconductor light-emitting device mounted on a dome-shaped or cup-shaped transparent substrate as a light source portion, a radiation flux immediately above the light-emitting device is increased, and light from the illuminant can be utilized efficiently in the light conducting body. Thus, uniform illuminance can be obtained.

The electrodes of the electrostatic protecting element can be formed so as to reflect light leaked downwards from the light-emitting device. For example, by forming the electrodes of the electrostatic protecting element in such a position as to substantially correspond to a light-emitting region of the light-emitting device, light emitted from the light-emitting region can be reflected upward. This structure also increases a radiation flux immediately above the light-emitting device, as well as the light utilization efficiency at which light from the light-emitting device is utilized in the light conducting body. Thus, more uniform illuminance can be obtained.

When a diode is used as the electrostatic protecting element, a linear illumination device highly endurable to static electricity can be obtained at a low fabrication cost.

Furthermore, in an image reading apparatus using the linear illumination device as described above, the light source portion (illuminant) and the photoelectric conversion element respectively formed on the first and second substrates can be electrically connected to each other without using leads. Therefore, the number of production steps can be reduced, and a disconnection accident occurring at a connecting point between the lead and the substrate can be prevented, whereby the reliability of the image reading apparatus can be enhanced.

Thus, the invention described herein makes possible the advantages of (1) providing a linear illumination apparatus having a small and compact structure, which can be produced at a low fabrication cost, and having a satisfactory illumination efficiency and a small variation of illuminance; (2) providing a linear illumination apparatus preferable for use in an image reading apparatus; and (3) an image reading apparatus which can realize the reduction of production steps, improvement of reliability, a low cost, and compactness.

These and other advantages of the present invention will become apparent to those skilled in the art upon reading and understanding the following detailed description with reference to the accompanying figures.

BRIEF DESCRIPTION OF THE DRAWINGS

FIG. 1A is a front cross-sectional view of a linear illumination device in a first embodiment of the present invention;

FIG. 1B is a side view of the linear illumination device shown in FIG. 1A viewed from an end opposing a light source portion;

FIG. 1C is a schematic view of a concave portion viewed in an A—A direction of FIG. 1A, where LEDs are arranged substantially parallel with a normal to a triangular wave surface;

FIG. 1D is a graph showing a shift of the width of condensed light in a longitudinal direction of a light conducting body in the arrangement shown in FIG. 1C;

FIG. 1E is a schematic view of a concave portion viewed in an A—A direction of FIG. 1A, where LEDs are arranged in a direction not parallel to a normal to the triangular wave surface; and FIG. 1F is a graph showing a shift of the width of condensed light in a longitudinal direction of the light conducting body in the arrangement shown in FIG. 1E.

FIG. 3 is a view schematically showing a cross-sectional shape of a light conducting body which can be used in the linear illumination device of the present invention.

FIG. 4 is a view illustrating an operation principle of the linear illumination device in the first embodiment of the present invention.

FIG. 5A is a front cross-sectional view of a linear illumination device in a second embodiment of the present invention;

FIG. 5B is a side view of the linear illumination device shown in FIG. 5A viewed from an end opposing a light source portion.

FIG. 9A is a front cross-sectional view of a modified linear illumination device in the third embodiment of the present invention; and FIG. 9B is a side view of the linear illumination device shown in FIG. 9A viewed from an end opposing a light source portion.

FIG. 12 is a cross-sectional view showing an end at which a light source portion is provided in a linear illumination device in a sixth embodiment of the present invention.

FIG. 14 is a cross-sectional view showing a vicinity of an end at which a light source portion is provided in a linear illumination device in an eighth embodiment of the present invention.

DESCRIPTION OF THE PREFERRED EMBODIMENTS

Figure 2A:
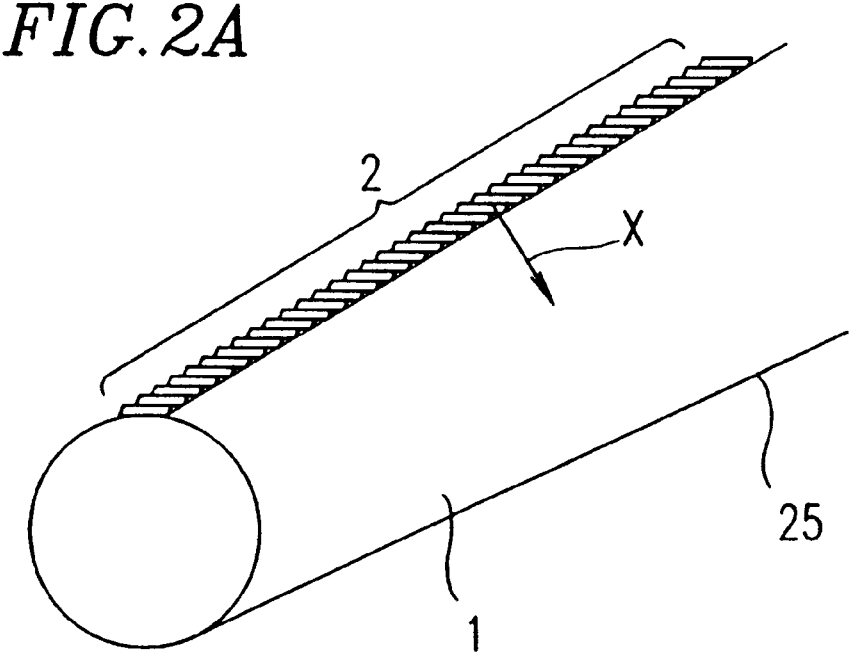
FIG. 2A is a view showing a schematic shape of the triangular surface formed on the light conducting body.

Hereinafter, the present invention will be described by way of several embodiments of a linear illumination device and an image reading apparatus with reference to the attached drawings.

Embodiment 1

FIG. 1A is a front cross-sectional view of a linear illumination device 1100 in the first embodiment of the present invention. FIG. 1B is a cross-sectional view of the linear illumination device 1100 viewed from an end opposing a light source portion.

The linear illumination device 1100 has a light conducting body 1. The light conducting body 1 is made of a transparent material and has a diameter which successively decreases from a first end 1110 at which a light source portion is provided to a second end 1120. A triangular wave surface 2 which includes a plurality of triangular configurations is provided on one side surface in a longitudinal direction of the light conducting body 1. Reference numerals 3, 4, 5, 6, and 25 denote a substrate with a concave portion, LEDs, a light-blocking portion, a light reflecting layer, and a light output portion, respectively. The diameter of the light conducting body 1 becomes largest (typically, about 5 mm) at the end with the LEDs 4 (light source portion), and the diameter becomes smallest (typically, about 2.5 mm) at the end with the light reflecting layer 6. As the LEDs 4, at least one light emitting device (e.g., a light-emitting diode) should be provided. If three LEDs 4 are provided, which respectively emit one of three different color lights, a color image processing can be conducted.

Considering light transparency, heat resistance, and moldability, examples of a material suitable for the light conducting body 1 include heat-resistant acrylic resin, polycarbonate resin, polyolefin, and the like. The light conducting body 1 is molded by an injection molding method, an extrusion method, or the like. A cap 5, formed of a black resin or a white resin such as acrylonitrile-butadiene-styrene (ABS) resin, is placed around an outer periphery of a connecting portion 7 of the light conducting body 1 as the light-blocking portion 5.

Next, a method for forming a light source portion of the linear illumination device 1100 will be described.

First, in order to obtain a substrate 3 with a concave portion, an insulating layer is formed on an aluminum substrate with thickness of about 0.4 mm to about 0.8 mm and a copper foil is attached to the insulating layer. Under this condition, the copper foil is etched to form a wiring pattern. The resultant substrate is subjected to electroplating or electroless plating using gold, whereby a circuit substrate is produced. Then, the circuit substrate is stamped with a convex die to form a concave portion therein. Thus, a substrate 3 with a concave portion is obtained. Next, the three LEDs 4 respectively emitting red, blue, and green light are mounted on a bottom surface of a truncated cone of the concave portion of the substrate 3, and the substrate 3 with the LEDs 4 attached thereto is placed on an end (the first end 1110) of the light conducting body 1, whereby a light source portion is formed.

In the substrate 3 thus formed, light-emitting angle distribution (orientation characteristics) of the LEDs 4 can be arbitrarily set based on a sloped shape of the side walls of the concave portion.

The respective LEDs 4 of the light source portion are selected so as to have the following light-emitting color: red (wavelength: about 600 nm to about 700 nm), green (wavelength: about 500 nm to about 600 nm), and blue (wavelength: about 400 nm to about 500 nm). The LEDs 4 emit light by being controlled in a time-divisional manner. This is because, in contrast with a simultaneous illumination system, it is not necessary to use a photoelectric conversion element for a color image, thereby realizing an image reading apparatus (explained later) at a low cost, when the LEDs 4 are controlled in time-division.

Furthermore, the light reflecting layer 6 is provided on the second end 1120 of the light conducting body 1 on which the LEDs 4 forming the light source portion are not disposed. The light reflecting layer 6 is formed by vapor-depositing a material film of titanium dioxide, aluminum, or the like, or by plating nickel or silver. The light reflecting layer 6 may be formed directly on the surface of the light conducting body 1, or may be disposed on the second end 1120 of the light conducting portion 1 as a separate member from the light conducting body 1.

FIGS. 1C is a schematic view of a concave portion viewed in an A—A direction of FIG. 1A, where the LEDs 4 are arranged substantially parallel with a normal X to the triangular wave surface 2 (also, referred to as a "first arrangement 41"). FIG. 1E is a schematic view of a concave portion viewed in the A—A direction of FIG. 1A, where the LEDs 4 are arranged in a direction not parallel to the normal X to the triangular wave surface 2 (also, referred to as a "second arrangement 42). FIGS. 1D and 1F show a shift of the width of condensed light in a longitudinal direction of the light conducting body 1 in the first arrangement 41 and the second arrangement 42, respectively. Assuming that the peak position of the illuminance is "0" and the peak value thereat is 100%, positions of 90% are represented as "1" and "−1", respectively. Furthermore, points on an axis representing effective illumination lengths correspond to positions relative to an incident surface N. Specifically, if a point on the axis moves from the left to the right, the corresponding position moves away from the incident surface N.

In the second arrangement 42 in which three LEDs 4 are arranged in a direction not parallel to the normal X to the triangular wave surface 2 as shown in FIG. 1E, it is understood from FIG. 1F that the peak position of the illuminance is shifted at a position close to the incident surface N. From the experiments, this shift occurs at point M which is apart from the incident surface N by about 15 mm. This is considered to be due to the distance between the position of the LEDs 4 and the triangular wave surface 2 (light diffusion portion) and the shape, size, and the like of the triangular wave surface 2.

On the other hand, in the first arrangement 41 in which the three LEDs 4 are arranged substantially parallel with the normal X to the triangular wave surface 2 as shown in FIG. 1C, no shift of the width of condensed light is found as shown in FIG. 1D. Thus, in order to prevent a shift of the width of condensed light caused by the position of the LEDs 4, it is desirable that the LEDs 4 are arranged substantially parallel with the normal X to the triangular wave surface 2.

Furthermore, for the purpose of obtaining a small and compact structure of the linear illumination device 1100, it is desirable that the light conducting body 1 is connected to the light source portion by clamping the substrate 3 to the light-blocking portion 5 via clamping pins 20. In addition, if the light conducting body 1 is coupled to the light source portion via a material (e.g., a transparent resin 24 such as an epoxy resin and a silicone resin) having the same refractive index as that of a material for the light conducting body 1 so as to obtain optical matching between the light conducting body 1 and the light source portion, the illuminance can be improved.

FIG. 2A is a view showing a schematic shape of the triangular wave surface 2 formed on the light conducting body 1 (X represents a direction of the normal to the triangular wave surface). A cross-sectional shape perpendicular to the longitudinal direction of the light conducting body 1 is in a circle. Furthermore, the light output portion 25 of the light conducting body 1 facing the triangular wave surface 2 is arched. Because of this, even when the light output portion 25 and a subject (not shown) receiving output light therefrom are positioned at any angle, the subject can receive a predetermined amount of light. More specifically, the light output portion 25 is formed so as to have an arched shape such as a circle, an oval, or a combination thereof.

Figure 2B:
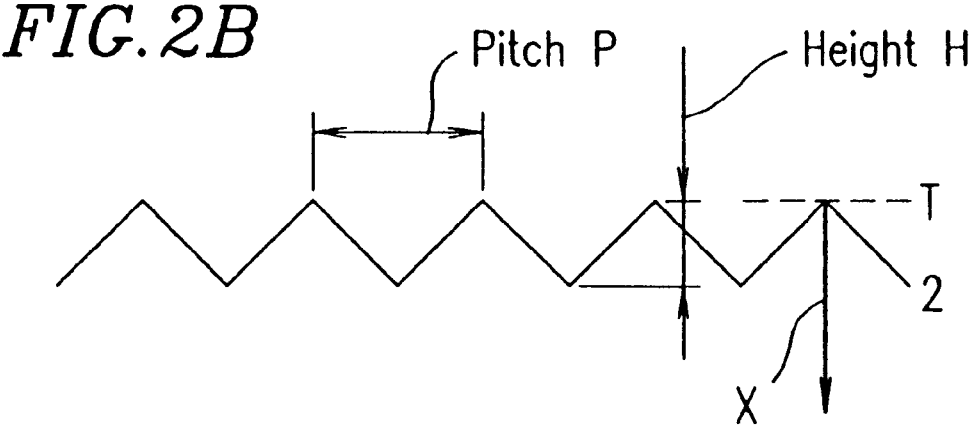
FIG. 2B is a view showing a direction of a normal to the triangular surface.

FIG. 2B is a view showing the normal X to the triangular wave surface 2 mentioned in the above description. More specifically, the normal to the triangular wave surface 2 represents a direction perpendicular to a tangent T to a vertex of the triangular wave surface 2.

FIG. 3 shows the case where a cross-sectional shape vertical to the longitudinal direction of the light conducting body 1 is a combination of a circle and an oval. The shape of the light output portion 25 of the light conducting body 1 is formed of a part of an oval as denoted by reference numeral 260, and a portion connected to the triangular wave surface 2 of the light conducting body 1 is a part of a substantial circle as denoted by reference numeral 270.

An operation principle of the linear illumination device 1100 in the present embodiment thus produced will be described with reference to FIG. 4. FIG. 4 is a front cross-sectional view of the linear illumination device 1100 in the present embodiment similar to that shown in FIG. 1A. In FIG. 4, arrows representing light traveling directions are also shown. In FIG. 4, the same components as those in FIG. 1a are denoted by the same reference numerals as those therein. The description thereof will be omitted here.

Light successively output from the three LEDs 4 is divided into light p which is directly incident upon the connecting portion 7 and light q which is reflected from the slopes 8 of the concave portion of the substrate 3 to be then incident upon the connecting portion 7.

The light p which is directly incident upon the connecting portion 7 all travels through an inside of the light conducting body 1, and repeats total reflection on the inside surfaces of the triangular wave surface 2 or the light conducting body 1. At this time, light r reflected or refracted from the triangular wave surface 2 turns downward at a large angle and is output from the light output portion 25 opposing the triangular wave surface 2 to radiate the surface of an original (not shown).

The size of the triangular wave surface 2 is typically as follows: a pitch P=about 320 $\mu$m and a height H=about 160 $\mu$m (see FIG. 2B).

On the other hand, the light q which is reflected from the slopes 8 to be then incident upon the connecting portion 7 is further divided into light which is totally reflected to travel through the inside of the light conducting body 1 and light which is directly output from the side surface of the connecting portion 7. If there exists such a light that is directly output from the side surface of the connecting portion 7, the illuminance at this portion becomes remarkably high, causing a large variation of the illuminance. However, in the present embodiment, a variation of the illuminance is suppressed by providing the light-blocking portion 5.

Light which is incident upon the light conducting body 1 and repeats total reflection to reach the second end 1120 is again totally reflected from the light reflecting layer 6 to return to the light conducting body 1 for reuse. Therefore, the light is utilized for radiating the surface of an original without any loss.

Based on such an operation principle, the linear illumination device 1100 capable of irradiating light to the surface of an original with an A4 size is produced, and its characteristics are evaluated. As a result, 24 LEDs are required in the conventional LED array type, whereas only 6 LEDs are required in the linear irradiation device 1100 in the present embodiment. Thus, the number of LEDs is reduced to ¼, resulting in a decrease in cost.

Figure 16:
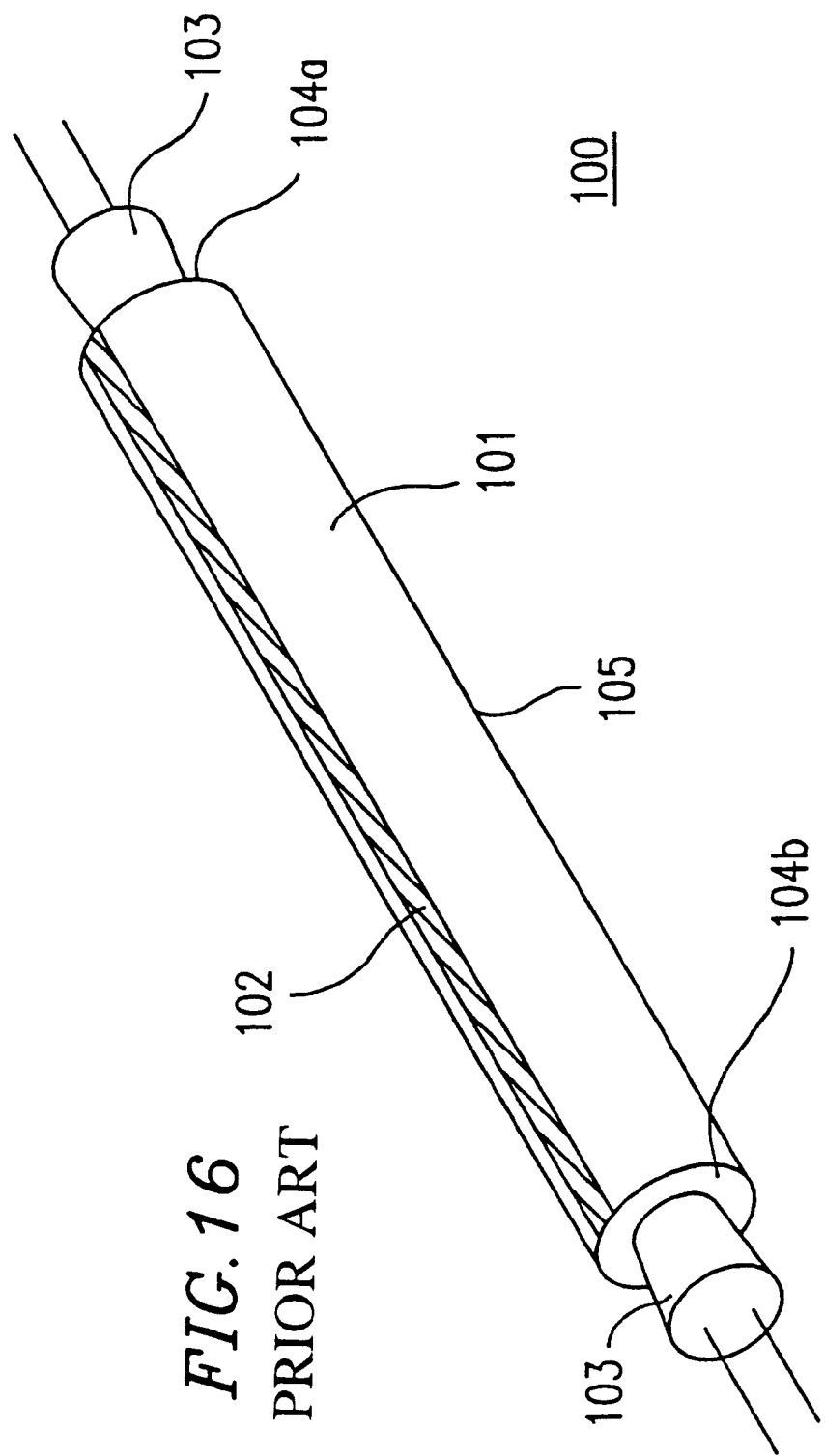
FIG. 16 is a perspective view schematically showing a structure of a conventional linear illumination device.
Figure 17:
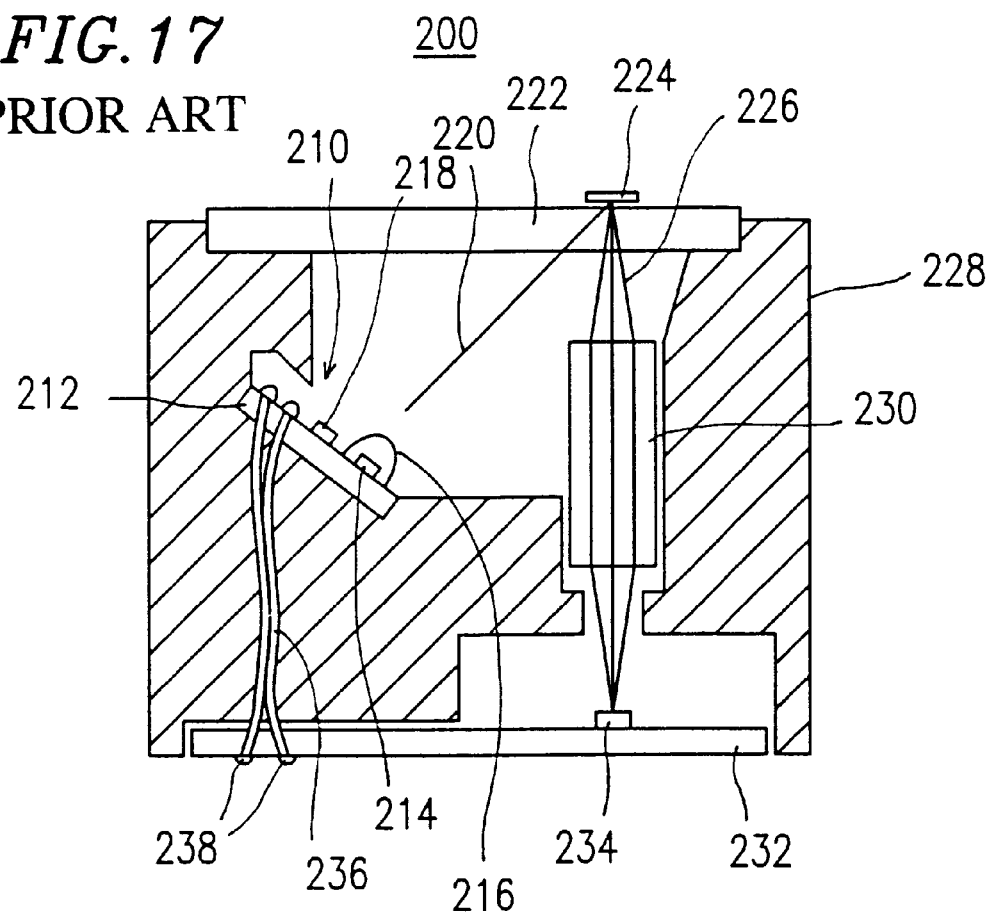
FIG. 17 is a cross-sectional view schematically showing a structure of a conventional image reading apparatus.

By employing the substrate 3 with a concave portion, the thickness of the light source portion is reduced to a half. Furthermore, the total length of the conventional linear illumination device 100 shown in FIG. 16 is about 236 mm, whereas the total length of the linear illumination device in the present embodiment is shortened by about 10 mm.

Furthermore, the distance between the linear illumination device and the surface of an original is generally required to be about 9.5 mm in the case of the conventional LED array type, whereas in the linear illumination device 1100 in the present embodiment, the distance between the linear illumination device and the surface of an original is made almost close to the thickness (about 1.1 mm) of a glass plate on which an original is to be placed. Because of this, even if the light source portion is brought into contact with the rear surface of the glass plate for placing an original, a variation of the illuminance can be suppressed within an allowable range, so that the linear illumination device 1100 with a small and compact size can be realized.

Embodiment 2

FIG. 5A is a front cross-sectional view of a linear illumination device 1200 in the second embodiment of the present invention. FIG. 5B is a side view of the linear illumination device 1200 viewed from an end opposing a light source portion. The same components as those in the linear illumination device 1100 in the first embodiment are denoted by the same reference numerals as those therein. The description thereof will be omitted.

In the linear illumination device 1200 in the present embodiment, a reflecting case 10, which is molded by a process such as an injection molding method and an exclusion method, using a material such as an ABS resin and a polycarbonate resin, is provided around a light conducting body 1. In addition, a rough surface 9 is provided in place of the light blocking portion 5, and the connecting portion 7 of the light conducting body 1 is omitted.

The reflecting case 10 functions as light reflecting means, and the light conducting body 1 is accommodated in the reflecting case 10. Thus, light which is output in the air from the light conducting body 1 in such a direction that is not directed to the surface of an original can be reused. According to an experiment, the illuminance on the surface of an original becomes about 1.5 times that in the case where no reflecting case 10 is provided.

Figure 6:
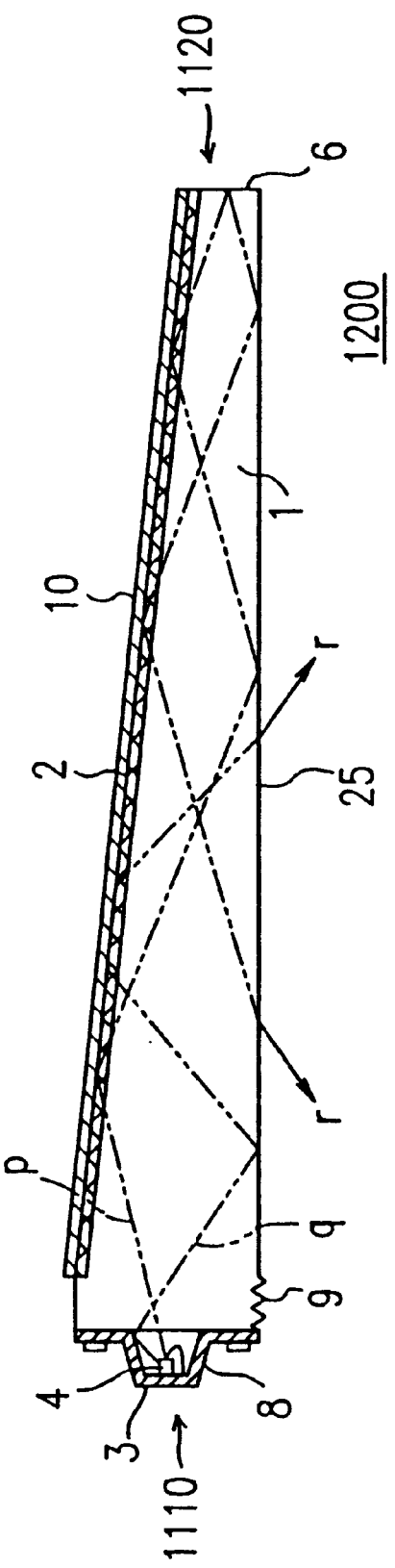
FIG. 6 is a view illustrating an operation principle of the linear illumination device in the second embodiment of the present invention.

An operation principle of the linear illumination device 1200 in the present embodiment thus produced will be described with reference to FIG. 6. FIG. 6 is a front cross-sectional view of the linear illumination device 1200 in the present embodiment similar to that shown in FIG. 5A. In FIG. 6, arrows representing light traveling directions are also shown. In FIG. 6, the same components as those in FIG. 5A are denoted by the same reference numerals as those therein. The description thereof will be omitted here.

Light successively output from the three LEDs 4 is divided into light p which is directly incident upon the light conducting body 1 and light q which is reflected from the slopes 8 of a concave portion of a substrate 3 to be incident upon the light conducting body 1.

The light p which is directly incident upon the light conducting body 1 all travels through the inside of the light conducting body 1, and repeats total reflection on the inside surfaces of the triangular wave surface 2 or the light conducting body 1. At this time, light r reflected or refracted from the triangular wave surface 2 turns downward at a large angle and is output from a light output portion 25 opposing the triangular wave surface 2 to radiate the surface of an original (not shown). The pitch P and the height H of the triangular wave surface 2 are the same as those in the first embodiment.

On the other hand, the light q which is reflected from the slopes 8 to be then incident upon the light conducting body 1 is further divided into light which is totally reflected to travel through an inside of the light conducting body 1 and light which is directly output from the side surface of the light conducting body 1. If there exists such a light that is directly output from the side surface of the light conducting body 1, the illuminance at this portion becomes remarkably high, causing a large variation of the illuminance. However, in the present embodiment, such light is diffused so as to emit toward the outside of the light conducting body 1 by providing the rough surface 9.

Light which is incident upon the light conducting body 1 and repeats total reflection to reach the second end 1120 is again totally reflected from the light reflecting layer 6 to return to the light conducting body 1 for reuse. Therefore, the light is utilized for radiating the surface of an original without any loss. The light reflecting layer 6 can be formed as a portion of the reflecting case 10.

Based on such an operation principle, the linear illumination device 1200 capable of irradiating light to the surface of an original with an A4 size is produced, and its characteristics are evaluated. As a result, 24 LEDs are required in the conventional LED array type, whereas only 4 LEDs are required in the linear irradiation device 1200 in the present embodiment. Thus, the number of LEDs is reduced to ⅙, resulting in a decrease in cost.

Furthermore, the total length of the conventional linear illumination device 100 shown in FIG. 16 is about 236 mm, whereas the total length of the linear illumination device in the present embodiment is shortened by about 12 mm. The total length of the linear illumination device of the present embodiment is further shortened by about 2 mm than the linear illumination device 1100 in the first embodiment. This is because the connecting portion 7 of the light conducting body 1 is not provided in the present embodiment.

Furthermore, the distance between the linear illumination device and the surface of an original is generally required to be about 9.5 mm in the case of the conventional LED array type, whereas in the linear illumination device 1200 in the present embodiment, the distance between the linear illumination device and the surface of an original is made almost close to the thickness (about 1.1 mm) of a glass plate on which an original is to be placed. Because of this, even if the light source portion is brought into contact with the rear surface of the glass plate for placing an original, a variation of the illuminance can be suppressed within an allowable range, so that the linear illumination device 1200 with a small and compact size can be realized.

Embodiment 3

Figure 7:
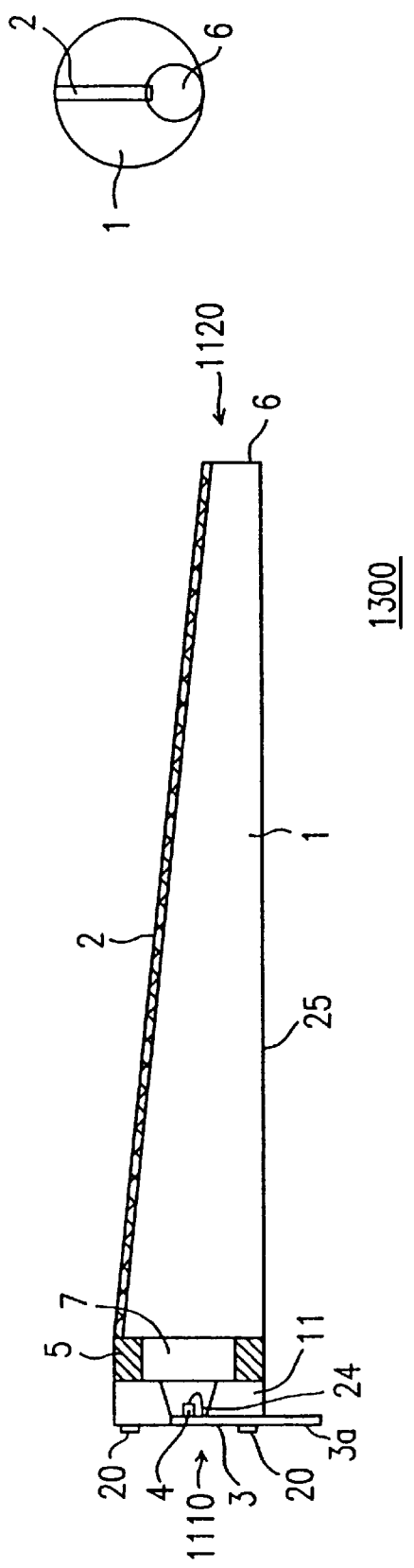
FIG. 7A is a front cross-sectional view of a linear illumination device in a third embodiment of the present invention.
FIG. 7B is a side view of the linear illumination device shown in FIG. 7A viewed from an end opposing a light source portion.

FIG. 7A is a front cross-sectional view of a linear illumination device 1300 in the third embodiment of the present invention. FIG. 7B is a side view of the linear illumination device 1300 viewed from an end opposing the light source portion. The same components as those in the linear illumination device 1100 in the first embodiment are denoted by the same reference numerals as those therein. The description thereof will be omitted.

The linear illumination device 1300 in the present embodiment has a configuration that is similar with that of the linear illumination device 1100 in the first embodiment, but the LEDs 4 are mounted on the substrate 3 of an integrally molded case 11. Upon the formation of the integrally molded case 11, a wiring pattern is provided on the substrate 3, for example, by etching and the three LEDs 4 respectively emitting red, blue, and green light are disposed at predetermined positions on the wiring pattern. The LEDs 4 are then sealed with a resin. A lead frame can be used as the substrate 3. The integrally molded case 11 has a concave portion, and the LEDs 4 are provided on a bottom surface of the concave portion. A light-emitting angle distribution (orientation characteristics) of the LEDs 4 can be arbitrarily set based on a shape of the concave portion. Furthermore, in order to obtain a mirror-finish surface on the concave portion, the surface is desirably plated with silver.

In the structure shown in FIG. 7A, a portion 3a of the substrate 3 is projected to exceed a diameter of an end 1110 of the light conducting body 1. The projected portion 3a functions as a substrate (first substrate) used for connection to a substrate (second substrate) on which a photoelectric conversion element is provided when the linear illumination device 1300 is incorporated into an image reading apparatus (described later), or can be utilized as a connecting portion to the first substrate.

Furthermore, for the purpose of obtaining a small and compact structure of the linear illumination device 1300, it is desirable for the light conducting body 1 to be connected to the light source portion by clamping the substrate 3 to a light-blocking portion 5 via clamping pins 20. In addition, if the light conducting body 1 is coupled to the light source portion via a material (e.g., a transparent resin 24 such as an epoxy resin and a silicone resin) having the same refractive index as that of a material for the light conducting body 1 so as to obtain optical matching between the light conducting body 1 and the light source portion, the illuminance can be improved.

Figure 8:
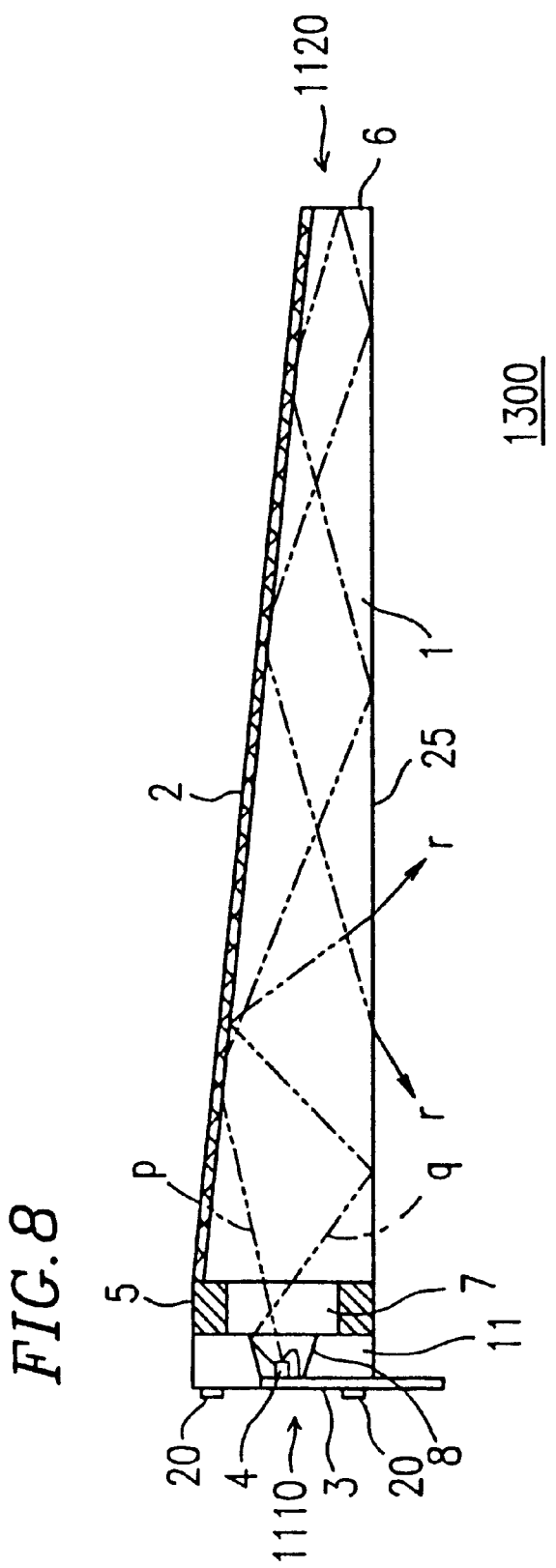
FIG. 8 is a view illustrating an operation principle of the linear illumination device in the third embodiment of the present invention.

FIG. 8 is a front cross-sectional view of the linear illumination device 1300 in the present embodiment similar to that shown in FIG. 7A. In FIG. 8, arrows representing light traveling directions are also shown. In FIG. 8, the same components as those in FIG. 7a are denoted by the same reference numerals as those therein. The description thereof will be omitted here.

Light successively output from the three LEDs 4 is divided into light p which is directly incident upon the connecting portion 7 and light q which is reflected from the slopes 8 of the concave portion of the substrate 3 to be incident upon the connecting portion 7. The light p which is directly incident upon the light conducing body 1 all travels through an inside of the light conducting body 1, and repeats total reflection on the inside surfaces of the triangular wave surface 2 or the light conducting body 1. At this time, light r reflected or refracted from the triangular wave surface 2 turns downward at a large angle and is output from the light output portion 25 opposing the triangular wave surface 2 to radiate the surface of an original (not shown). This illumination principle is substantially the same as that in the first or second embodiment. Thus, the illumination principle will not be described in more detail here.

FIG. 9A is a front cross-sectional view of another linear illumination device 1350 in the third embodiment of the present invention. FIG. 9B is a side view of the linear illumination device 1350 viewed from an end opposing the light source portion. More specifically, in the linear illumination device 1350, the above-mentioned integrally molded case 11 is incorporated into the linear illumination device 1200 in the second embodiment. The same components as those described so far are denoted by the same reference numerals as those described above. The description thereof will be omitted here.

In the linear illumination device 1350, the same effects as those in the linear illumination device 1300 are obtained.

Based on such an operation principle, the linear illumination devices 1300 and 1350 capable of irradiating light to the surface of an original with an A4 size are produced, and their characteristics are evaluated. As a result, 24 LEDs are required in the conventional LED array type, whereas only 6 LEDs and 4 LEDs are required in the linear irradiation devices 1300 and 1350, respectively, in the present embodiment. Thus, the number of LEDs is reduced to ¼ and ⅙, respectively, resulting in a decrease in cost.

Furthermore, the total length of the conventional linear illumination device 100 shown in FIG. 16 is about 236 mm, whereas the total length of the linear illumination device 1300 in the present embodiment is shortened by about 10 mm and the total length of the linear illumination device 1350 in the present embodiment is shortened by about 12 mm.

Furthermore, the distance between the linear illumination device and the surface of an original is generally required to be about 9.5 mm in the case of the conventional LED array type, whereas in the linear illumination device 1300 or 1350 in the present embodiment, the distance between the linear illumination device and the surface of an original is made almost close to the thickness (about 1.1 mm) of a glass plate on which an original is to be placed. Because of this, even if the light source portion is brought into contact with the rear surface of the glass plate for placing an original, a variation of the illuminance can be suppressed within an allowable range, so that the linear illumination device 1300 or 1350 with a small and compact size can be realized.

Embodiment 4

Figure 10:
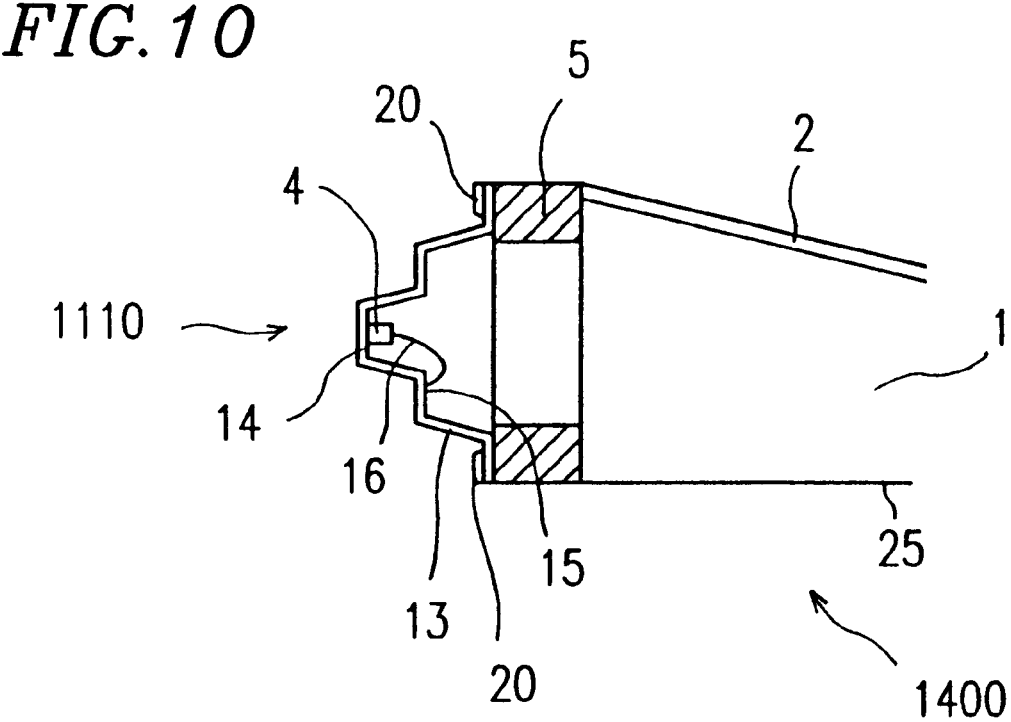
FIG. 10 is a cross-sectional view showing a vicinity of an end at which a light source portion is provided in a linear illumination device in a fourth embodiment of the present invention.

FIG. 10 is a cross-sectional view showing a vicinity of a first end 1110 of a linear illumination device 1400 in the fourth embodiment of the present invention. The same components as those in the linear illumination device 1100 in the first embodiment are denoted by the same reference numerals as those therein. The description thereof will be omitted here.

In the present embodiment, the level of a surface 15 to which wires 16 (e.g., gold wires) connected to LEDs 4 are to be connected is made different from the level of an LED mounting surface 14 in the substrate 13. Thus, a size of the LED mounting surface 14 of the substrate 13 having a concave portion can be made small, resulting in an increase in illuminance.

Furthermore, if the LEDs 4 are connected to the substrate 13 via, for example, microbumps instead of the wires 16, the substrate 13 having a concave portion can be further miniaturized, whereby illuminance can be further improved.

Embodiment 5

Figure 11A:
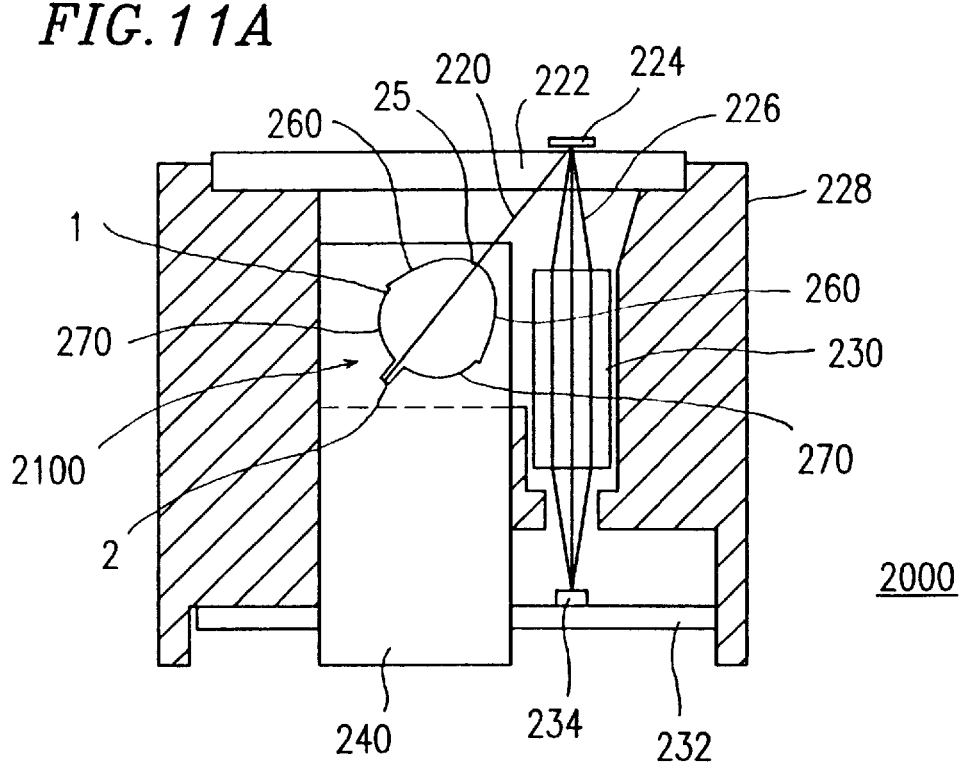
FIG. 11A is a view schematically showing a structure of an image reading apparatus in a fifth embodiment of the present invention.

An image reading apparatus 2000, as the fifth embodiment of the present invention, will be described below, which uses a linear illumination device 2100 of the present invention having the characteristics as described in the first to fourth embodiments as a light conducting body. FIG. 11A is a view schematically showing a structure of the image reading apparatus 2000.

As described in the above-mentioned embodiments, light is emitted from a light output portion 25 opposing a triangular wave surface 2 of a light conducting body 1 of the linear illumination device 2100 in the image reading apparatus 2000 in FIG. 11A. Output light 220 passes through a cover glass 222 (which functions as a document table and a cover), is incident upon the surface of an original surface (i.e., a document surface) 224 (subject) to be illuminated, and is reflected from the original surface 224. Reflected light 226 passes through a cover glass 222, and is incident upon a rod lens array 230 fixed by a metal frame 228. An image of the original surface 224 is formed on a photoelectric conversion element 234 mounted on a wiring board 232 by the rod lens array 230. The wiring board 232 is connected to LEDs (not shown) of the linear illumination device 2100, not by leads as in the prior art, but by extending the substrate 240 to a position close to the wiring board 232.

Since the light conducting body 1 of the linear illumination device 2100 attached to the substrate 240 is required to irradiate light to the original surface (subject) 224 with a predetermined light amount and illuminance, the light conducting body 1 is disposed in the vicinity of the original surface 224. The output light 220 output from the light conducing body 1 is incident onto the original surface 224 in a direction oblique thereto.

A cross-sectional shape of the light conducting body 1 of the linear illumination device 2100 shown in FIG. 11A is the same as that described with reference to FIG. 3 in the first embodiment. More specifically, a cross-sectional shape perpendicular to a longitudinal direction of the light conducting body 1 is a combination of a circle and an oval, and the shape of the light output portion 25 of the light conducting body 1 is an arch formed of a part of an oval 260. A portion connecting to the triangular wave surface 2 of the light conducting body 1 is formed of a part 270 of a substantial circle. By forming the light output portion 25 of the part 260 of an oval, the output light 220 with a predetermined light amount and intensity can be incident onto the original surface 224.

The reflected light 226 after being radiated onto the original surface 224 reaches the photoelectric conversion element 234 via the rod lens array 230 positioned immediately below the original surface 224. The photoelectric conversion element 234 is provided on the wiring board 232. The wiring board 232 is disposed farthest from the original surface 224.

Figure 11B:
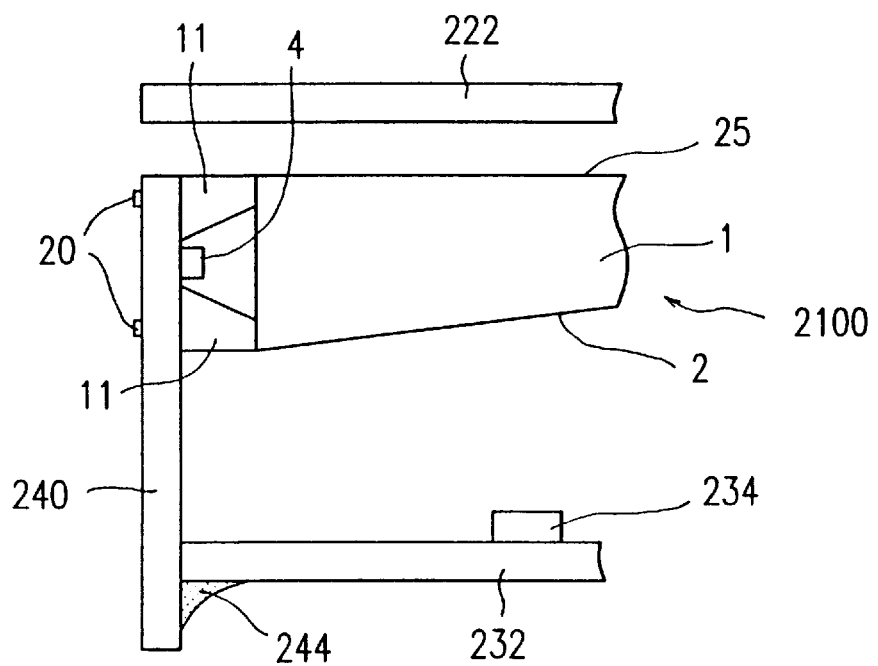
FIG. 11B is an partially enlarged view of the image reading apparatus viewed at another angle.

FIG. 11B is a partial enlarged view of FIG. 11A viewed at another angle. In FIG. 11B, an arrangement relationship between the substrate 240 and the wiring board 232 is given particular attention. The same components as those in FIG. 11A are denoted by the same reference numerals as those therein. The description thereof will be omitted here. Reference numeral 11 denotes an integrally molded case described above with reference to FIG. 8, and reference numeral 20 denotes clamping pins as described above.

As shown in FIG. 11B, the substrate (first substrate) 240 is extended to a position close to the wiring board 232 so as to abut against the wiring board (second substrate) 232. Basically, the length of the substrate 240 should be at least set so that the light conducting body 1 of the linear illumination device 2100 can be provided thereon. In the present embodiment, the length of the substrate 240 is made longer so as to come into contact with the wiring board 232. In a portion where the substrates 232 and 240 abut against each other or in the vicinity thereof, the wiring patterns (not shown) formed on the substrates 232 and 240, i.e., the wiring patterns for electrically connecting the LEDs 4 to the photoelectric conversion element 234, are electrically connected via a solder 244. Thus, leads for electrically connecting the LEDs 4 to the photoelectric conversion element 234 can be omitted. Therefore, an accident, particularly caused by disconnection of leads, can be prevented.

Although the substrates 232 and 240 are electrically connected via the solder 240 in the above explanation of the present embodiment, they may be connected by another connecting method (e.g., a connector).

Embodiment 6

FIG. 12 is a cross-sectional view showing a vicinity of a first end 1110 in a linear illumination device 1600 in the sixth embodiment of the present invention. More specifically, in the linear illumination device 1600, a GaN type LED is used as an LED 604 of a light source portion, and the LED 604 is connected to a wiring pattern on the substrate 603 via a diode 605 as an electrostatic protecting element.

The diode 605 has two polar sections electrically connected to a P-type semiconductor region and an N-type semiconductor region of the LED 604, respectively. When a certain voltage exceeding a predetermined voltage which is equal to or lower than a breakdown voltage of the LED 604 is applied across the P-type semiconductor region and the N-type semiconductor region of the LED 604, a current flows across the two polar sections.

A P-electrode and an N-electrode electrically connected respectively to the P-type semiconductor region and the N-type semiconductor region of the LED 604 are further connected to an N-electrode and a P-electrode of the diode element 605, respectively. More specifically, the diode 605 is overlaid on the LED 604, so that they are electrically connected to each other via microbumps 610. The diode 605 is mounted on the substrate 603 with a conductive adhesive 609. When the diode 605 is mounted on the substrate 603, one of the electrodes of the diode 605 is electrically connected to the wiring pattern (not shown) on the substrate 603, and the other electrode is electrically connected to the wiring pattern on the substrate 603 by a metal fine wire 606. The LED 604 and the diode 605 connected to each other are covered with a transparent resin 607.

More specifically, the LED 604 is constituted by forming a predetermined semiconductor layer structure on a transparent substrate (in FIG. 12, the transparent substrate and the semiconductor layered structure are not shown in detail, and they are collectively referred to as the LED 604). Since the LED 604 is transparent, light which is output from a light emitting portion thereof is passed through the LED 604 and further through the transparent resin 607 to directly enter the light conducting body 1. In addition, light which is output in the side directions of the LED 604 is reflected from a reflecting surface of a reflecting cap 608 formed of a high reflective white resin such as a polycarbonate (PC) resin, an acrylonitrile-butadiene-styrene (ABS) resin and the like, and enters the light conducting body 1. Furthermore, light which is leaked downwards from the LED 604 is reflected from an electrode formed in such a region on the upper surface of the diode 605 that substantially corresponds to a light-emitting region of the LED 604. Then, the reflected light enters the light conducting body 1 in the same way as in the above. The light which enters the light conducting body 1 is output from a light output portion 25 after being reflected from a triangular wave surface 2, as described in the first to fourth embodiments.

In the above-mentioned structure, the linear illumination device 1600 which can significantly endure static electricity is obtained by using the diode 605. Furthermore, a radiation flux emitted from the light source portion is increased to enhance the illuminance of the light conducting body 1.

Embodiment 7

Figure 13:
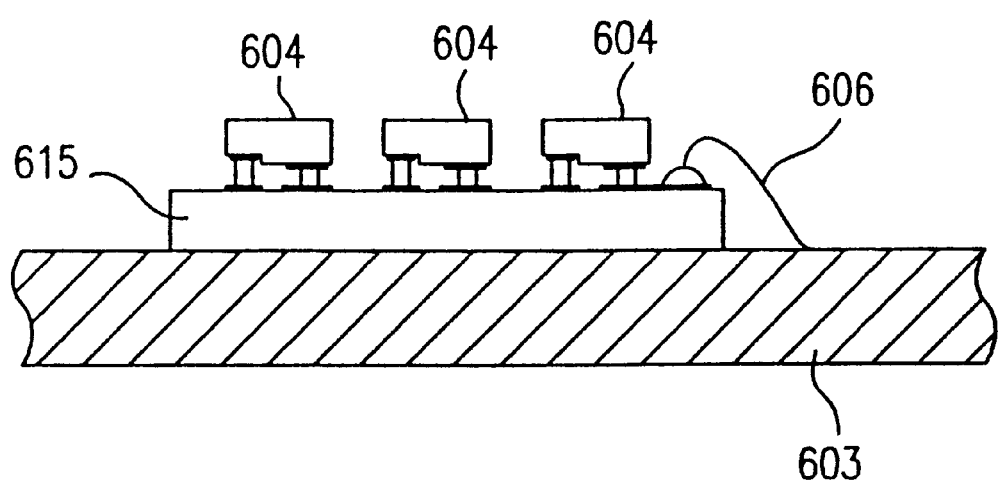
FIG. 13 is a cross-sectional view showing a vicinity of LEDs provided in a light source portion in a linear illumination device in a seventh embodiment of the present invention.

FIG. 13 shows a case where a plurality of LEDs 604 are connected onto a single diode 615, as a modified example of the structure shown in FIG. 12 illustrated in the sixth embodiment.

In the above-mentioned structure, since the diode 615 common to a plurality of LEDs 604 is used, the number of dicing of the diode 615 is reduced, and it is possible to use only one common metal fine wire 606. Furthermore, mounting in a smaller space can be realized.

It is also possible that a plurality of diodes 615, each of which is then corresponds to a plurality of LEDs 604, are provided.

Embodiment 8

FIG. 14 shows a structure of a linear illumination device 1800 which is a modified example of the structure shown in FIG. 12 illustrated in the sixth embodiment. In the linear illumination device 1800, an LED 604 is provided in a recess 611 formed in a diode 625. The recess 611 in the diode 625 functions as a reflector which reflects light from the LED 604.

In this structure, the reflecting cap 608 in the structure (FIG. 12) of the sixth embodiment can be omitted, so that fabrication cost is reduced and assembly workability is improved. Moreover, in the case where a plurality of LEDs 604 each having different wavelengths for reading a color original are to be used, in the structure (FIG. 12) of the sixth embodiment, the reflecting cap 608 cannot be made smaller in view of the assembly workability. However, in the structure in the present embodiment shown in FIG. 14, a light condensing property in the light source portion can be enhanced and a light utilization efficiency in the light conducting body 1 can be increased by forming the recess 611 in a smaller size. Furthermore, the illuminance is enhanced, and uniformity of illumination is improved.

Embodiment 9

Figure 15A:
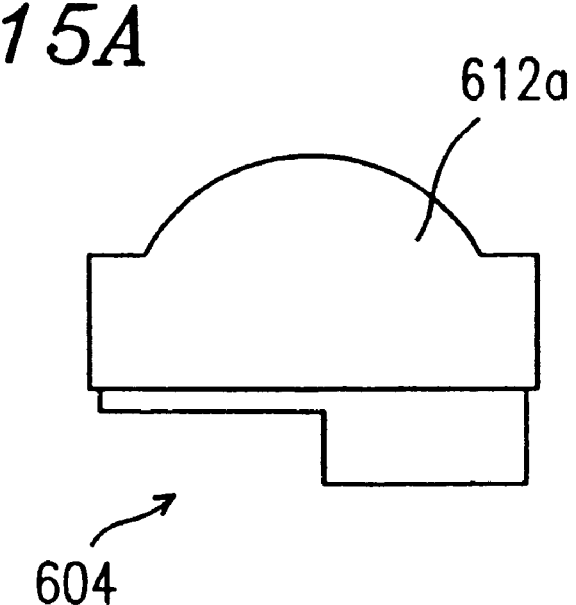
FIGS. 15A and 15B schematically show shapes of LEDs provided in a light source portion in a linear illumination device in a ninth embodiment of the present invention.
Figure 15B:
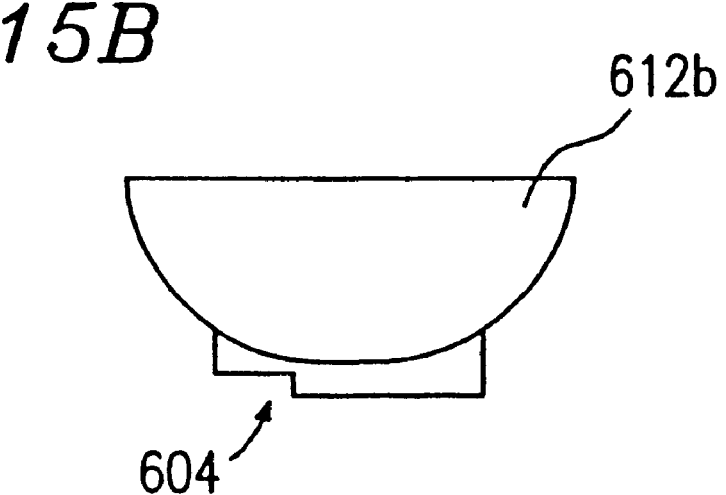

FIGS. 15A and 15B show further modified examples of a transparent substrate of an LED 604 shown in FIG. 12 illustrated in the sixth embodiment. Specifically, FIG. 15A shows the case where a dome-shaped substrate 612a is used as the transparent substrate of the LED 604, while FIG. 15B shows the case where a cup-shaped substrate 612b is used therefor. It should be noted that the configuration illustrated in FIGS. 15A and 15B is to replace the LED 604 in FIG. 12.

In these structures, due to the light condensing function of the dome-shaped substrate 612a or the cup-shaped substrate 612b with respect to light emitted from the LED 604, a light condensing property of the light source portion is enhanced, and a light utilization efficiency in the light conducting body 1 is increased.

In each linear illumination device in the sixth to ninth embodiments, a connecting portion 7 may be provided between the light source portion and the light conducting body 1 as in the first embodiment. Alternatively, a rough surface 9 may be provided in the light conducting body 1 in the vicinity of the light source portion as in the second embodiment.

Any of the linear illumination device illustrated in each of the above-mentioned embodiments can be incorporated into the image reading apparatus illustrated in the fifth embodiment.

As described above, according to the present invention, a linear illumination device with a high illumination efficiency and a small variation of illuminance with respect to the surface of an original (i.e., a document surface) can be realized by using a small and compact light conducting body at a low fabrication cost. Furthermore, according to the present invention, an image reading apparatus with high reliability which can be produced in a smaller number of steps is provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A linear illumination device, comprising:
   a light conducting body with at least a portion of a cross-sectional shape perpendicular to a longitudinal direction of the light conducting body having an arch shape;
   a light diffusion portion formed at least in the portion having an arch shape in the longitudinal direction of the light conducting body;
   a light output portion formed in a portion of the light conducting body opposing the light diffusion portion;
   a light source portion disposed at a first end face of the light conducting body; and
   a light reflecting layer provided at a second end face of the light conducting body opposing the first end face of the light conducting body,
   wherein an area of the cross-sectional shape of the light conducting body successively decreases along the longitudinal direction of the light conducting body from the first end face to the second end face.

2. A linear illumination device according to claim 1, further comprising a non-light diffusion portion provided between the light source portion and the light diffusion portion.

3. A linear illumination device according to claim 1, further comprising a rough surface for diffusing light, provided in a portion of the light conducting body between the light source portion and the light diffusion portion.

4. A linear illumination device according to claim 1, wherein the arch shape is a portion of a circle, an oval, or a combination thereof.

5. A linear illumination device according to claim 1, wherein the light conducting body is made of a transparent material, and a size of a diameter of the second end face of the light conducting body at which the light reflecting layer is disposed is about half that of a diameter of the first end face of the light conducting body at which the light source portion is disposed.

6. A linear illumination device according to claim 1, wherein a triangular wave surface including a plurality of triangular configurations is formed on the light diffusion portion.

7. A linear illumination device according to claim 1, wherein a red light emitting device, a green light emitting device, and a blue light emitting device are disposed in the light source portion along a line substantially parallel to a normal to the triangular wave surface.

8. A linear illumination device according to claim 7, wherein the red light emitting device, the green light emitting device, and the blue light emitting device are controlled in a time-divisional manner.

9. A linear illumination device according to claim 1, further comprising a light reflecting unit provided around an outer peripheral portion of the light conducting body at least excluding the light output portion.

10. A linear illumination device according to claim 9, wherein the light reflecting unit is a reflecting case, and the light conducting body is accommodated in the reflecting case.

11. A linear illumination device according to claim 1, wherein the light source portion includes a substrate having a concave portion formed as a truncated cone,
   a surface is provided at a different level from a level of the bottom surface of the concave portion of the substrate, first conductive pattern is provided on the bottom surface of the concave portion and a second conductive pattern is provided on the surface at the different level, and a light emitting device is mounted on the first conductive pattern and is electrically connected to the second conductive pattern by a metal fine wire.

12. A linear illumination device according to claim 1, wherein the light source portion has a light emitting device which is mounted on a substrate in a concave portion of a case, wherein the case is formed by integrally molding the substrate and a resin.

13. A linear illumination device according to claim 12, wherein the light emitting device has a P-electrode and an N-electrode on an identical side, and the P-electrode and the N-electrode are electrically connected to a predetermined wiring pattern on the substrate in the concave portion via a conductive adhesive or microbumps.

14. A linear illumination device according to claim 13, wherein the concave portion is sealed with a transparent resin having a refractive index which is almost the same as a refractive index of the light conducting body.

15. A linear illumination device according to claim 1,
wherein the light source portion has a light emitting device and an electrostatic protecting element electrically connected to the light emitting device, the light emitting device has a P-type semiconductor region and an N-type semiconductor region formed on a substrate, and the electrostatic protecting element has two polar portions electrically connected respectively to the P-type semiconductor region and the N-type semiconductor region of the light emitting device, and is configured so that an electric current flows between the two polar portions when a certain voltage exceeding a predetermined voltage which is equal to or smaller than a breakdown voltage is applied across the P-type semiconductor region and the N-type semiconductor region of the light emitting device.

16. A linear illumination device according to claim 15, wherein the light emitting device and the electrostatic protecting element are electrically connected to each other via microbumps.

17. A linear illumination device according to claim 15, wherein a plurality of the light emitting devices are connected to the identical electrostatic protecting element.

18. A linear illumination device according to claim 15, wherein the electrostatic protecting element has a reflecting structure which reflects light from the light emitting device.

19. A linear illumination device according to claim 18, wherein the reflecting structure is a recess, and an inside of the recess is sealed with a resin.

20. A linear illumination device according to claim 15, wherein the light emitting device is a GaN type compound semiconductor light emitting device mounted on a transparent substrate.

21. A linear illumination device according to claim 20, wherein the transparent substrate has a dome shape.

22. A linear illumination device according to claim 20, wherein the transparent substrate has a cup shape.

23. A linear illumination device according to claim 15, wherein the electrostatic protecting element has an electrode formed so as to reflect light from the light emitting device.

24. A linear illumination device according to claim 15, wherein the electrostatic protecting element is a diode.

25. An image reading apparatus, comprising:
a first substrate and a second substrate;
a linear illumination device, which has a light source attached to the first substrate; and
a photoelectric conversion element which is mounted on the second substrate and responds to light emitted from the light source portion of the linear illumination device and reflected from a predetermined subject,
wherein the linear illumination device is the linear illumination device according to claim 1,
the first substrate and the second substrate are disposed so as to abut against each other, and
a wiring pattern provided on the first substrate and a wiring pattern provided on the second substrate are electrically connected to each other at the abutting portion or in the vicinity thereof.

26. An image reading apparatus according to claim 25, wherein the first substrate is extended so as to abut against the second substrate.

27. An image reading apparatus according to claim 25, wherein the wiring pattern provided on the first substrate and the wiring pattern provided on the second substrate are electrically connected to each other via a solder.

* * * * *